E. C. WOOD & H. G. MARDEN.
APPARATUS FOR SUBMARINE SIGNALING.
APPLICATION FILED MAY 31, 1905.

945,998.

Patented Jan. 11, 1910.
4 SHEETS—SHEET 1.

E. C. WOOD & H. G. MARDEN.
APPARATUS FOR SUBMARINE SIGNALING.
APPLICATION FILED MAY 31, 1905.

945,998.

Patented Jan. 11, 1910.
4 SHEETS—SHEET 3.

WITNESSES:
M. E. Flaherty
W. P. O'Brient

INVENTORS
Edward C. Wood
+ Harry G. Marden

UNITED STATES PATENT OFFICE.

EDWARD C. WOOD, OF SOMERVILLE, AND HARRY G. MARDEN, OF BRAINTREE, MASSACHUSETTS, ASSIGNORS TO SUBMARINE SIGNAL COMPANY, OF WATERVILLE, MAINE, A CORPORATION OF MAINE.

APPARATUS FOR SUBMARINE SIGNALING.

945,998.  Specification of Letters Patent. Patented Jan. 11, 1910.

Application filed May 31, 1905. Serial No. 263,165.

*To all whom it may concern:*

Be it known that we, EDWARD C. WOOD, of Somerville, in the county of Middlesex and State of Massachusetts, and HARRY G. MARDEN, of Braintree, in the county of Norfolk, in the State of Massachusetts, both citizens of the United States, have invented a new and useful Improvement in Apparatus for Submarine Signaling, of which the following is a specification.

Our invention relates more especially to means whereby a submarine bell or other source of sound may be set in powerful vibration promptly and with certainty, said means being comparatively light and simple and selfcontained within the bell sustaining structure.

In our description we use the term bell but do not mean to limit ourselves to what is ordinarily so termed.

This invention will be understood by reference to the drawings, in which—

Figure 2:
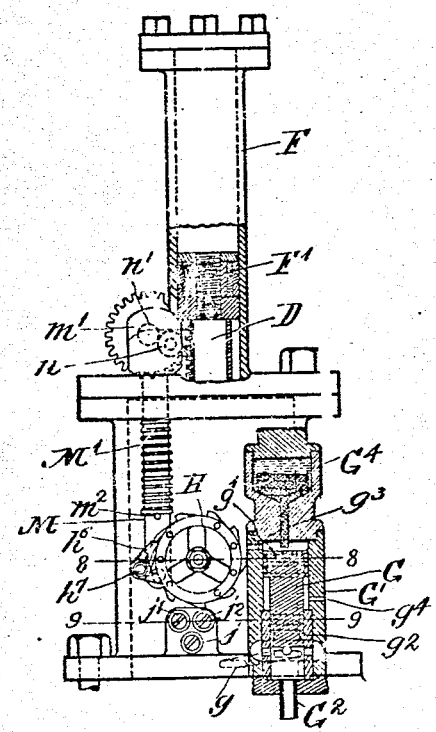
Figure 3:
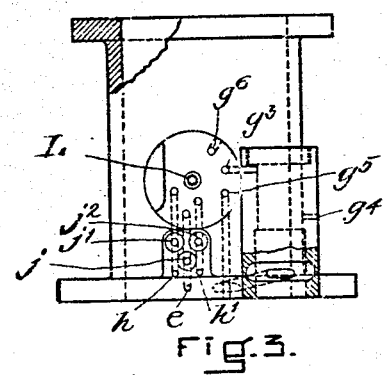
Figure 1:
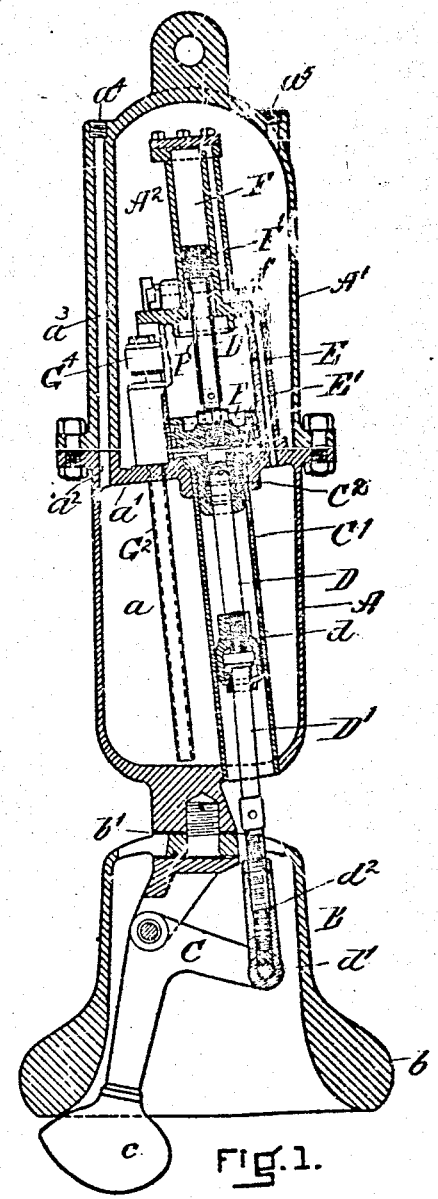
Figure 4:
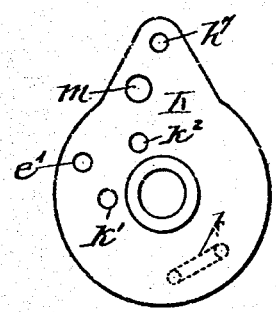
Figure 5:
Figure 6:
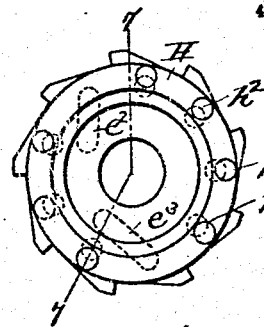
Figure 7:
Figure 8:
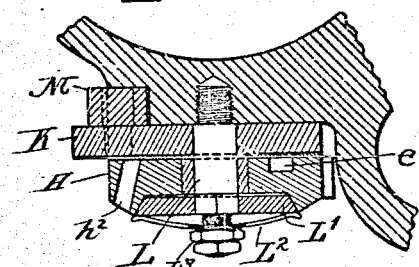
Figure 9:
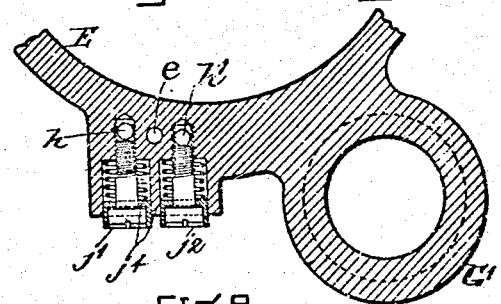
Figure 10:
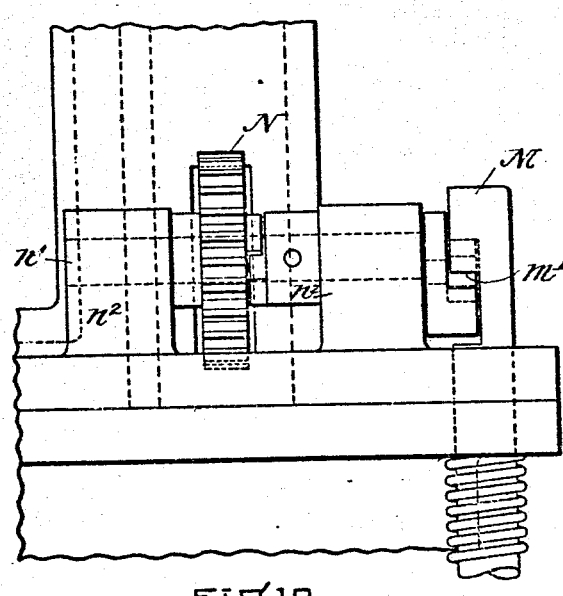
Figure 11:
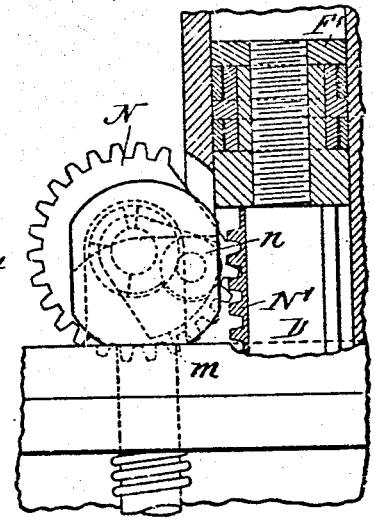
Figure 12:
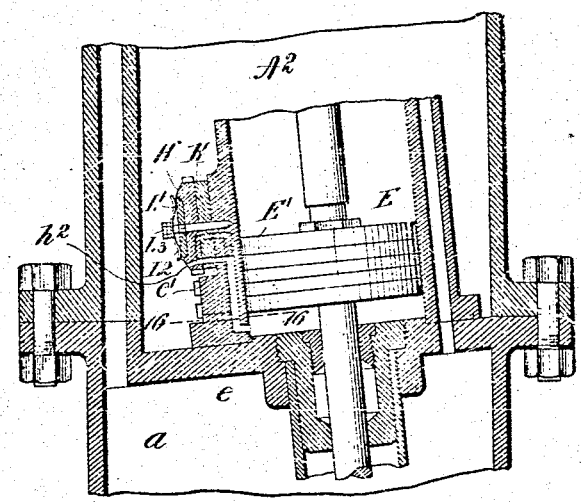
Figures 13, 14, 15:
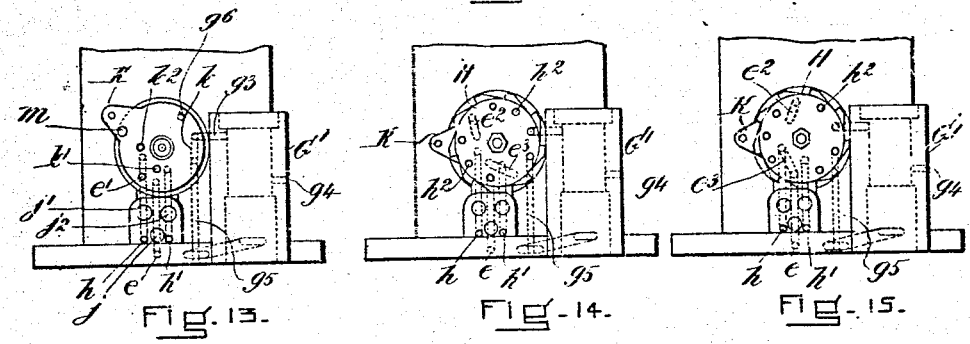
Figure 16:
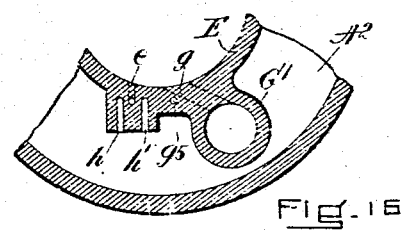
Figure 17:
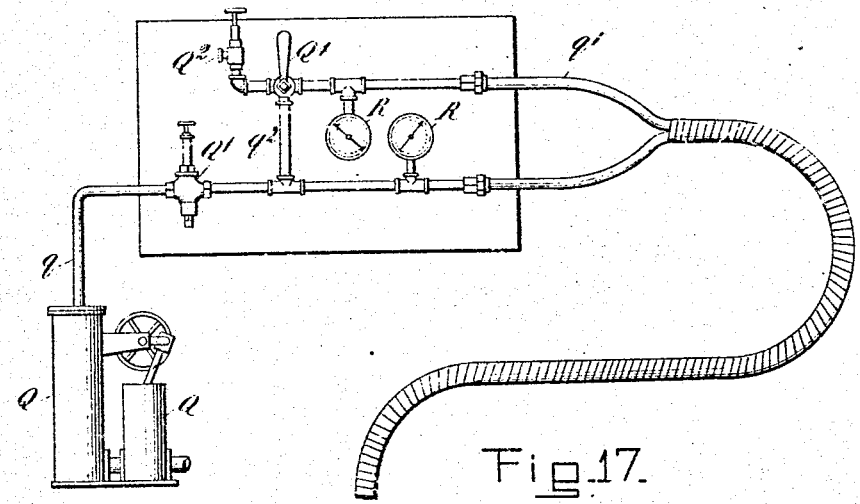
Figure 18:
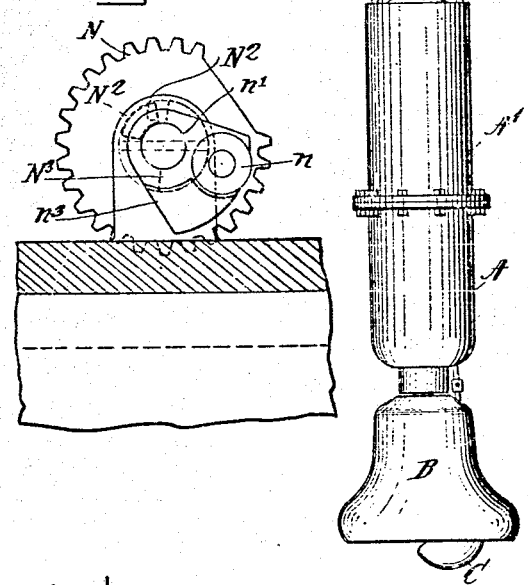
Figure 19:
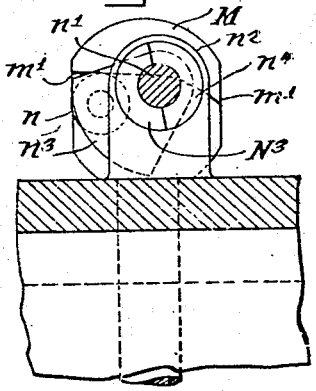

Figure 1 is a vertical section of a mechanism embodying this invention. Fig. 2 is an elevation partly in section of the cylinders showing the valve mechanism. Fig. 3 is an elevation of the lower cylinder and valve, the code wheel being removed to show one arrangement of ports. Figs. 4 and 5 are details of the pawl lever. Fig. 6 is an elevation of the code wheel, Fig. 7 being a section on line 7—7 of Fig. 6. Fig. 8 is an enlarged sectional view taken on line 8—8 of Fig. 2. Fig. 9 is an enlarged sectional view taken on line 9—9 of Fig. 2. Fig. 10 is a front elevation of the valve controlling mechanism, and Fig. 11 is a side view thereof, partly in section. Fig. 12 is a sectional detail showing the lower end of the exhaust chamber and cylinder. Fig. 13 is a detail, the code wheel being removed, showing the pawl lever and its relation to the various passages hereinafter referred to. Figs. 14 and 15 are details showing the code wheel in two positions and the relation of the various passages thereto. Fig. 16 is a sectional detail of a portion of the front of the cylinder, etc., on the plane of line 16—16, Fig. 12. Fig. 17 is a general view showing the connections with the air compressor, etc. Fig. 18 is an end view of the cam roll and the shaft to which it is connected corresponding to Fig. 11, the valve rod and its head being omitted, and Fig. 19 is a section of said shaft taken between the pinion and the bearing in which the shaft is carried.

The casing is for convenience made in two parts, the lower part A in which is the reservoir $a$ for compressed air, and the upper part $A^1$ in which the cylinders are contained. To the bottom of the lower part A of the casing is attached the bell B which in order to get the necessary tone is preferably provided with a thickened rim $b$. A rubber gasket $b^1$ is preferably laid between the bell and casing when the two are attached to confine the vibrations to the bell. Within the bell is pivotally hung the hammer lever C to the lower end of which is attached the striker $c$. As shown in Fig. 1 the hammer is in position to be swung over against the opposite rim to cause its vibration.

The casing has a partition $a^1$ integral with the lower part of the casing and forming the upper wall of the reservoir through which partition is an opening $a^2$ leading to the passage $a^3$ formed in the side wall of the upper part $A^1$ of the casing. This passage terminates in the nipple $a^4$ by which the passage is connected to the delivery chamber of an air pump or other source of compressed air on shore or shipboard. By this means the reservoir is supplied with compressed air.

Through the reservoir passes the tube $C^1$ the ends of which are brazed into openings in the partition $a^1$ and the bottom of the lower part of the casing. Within the upper end of the tube $C^1$ and attached to the partition $a^1$ is a stuffing box $C^2$ through which slides the piston rod $D$. The lower end of the piston rod $D$ is connected by means of a connecting rod $D^1$ with the hammer lever C, the coupling $d$ between the piston rod and the connecting rod being such as to allow the piston rod to rotate freely with relation to the connecting rod should it be inclined to do so. The connection between the connecting rod $D^1$ and the hammer lever is preferably a yielding connection. For example, the connecting rod $D^1$ has a slot near its lower end. The hammer lever is attached to the connecting rod by the pin $d^1$ which passes through the slot and is normally held at the bottom of the slot by the spring $d^2$. The piston rod being lifted in the manner described below lifts the hammer lever but its upward movement stops before the hammer strikes the bell, the momentum of the striker $c$ carrying it against the bell from which it rebounds at once so as not to deaden its vibrations.

Movement is given to the piston rod by means of a differential piston operating in the cylinders E and F. Within the larger cylinder E is the piston $E^1$ which is raised by air pressure exerted in the cylinder E below it. The piston rod D is extended up through the piston $E^1$ and carries at its upper end the smaller piston $F^1$ which slides in the smaller cylinder F. The upper end of the cylinder F is always connected with the reservoir $a$ by the passage $f$ so there is a constant pressure on the piston $F^1$ tending to move it downward. At the proper time a like pressure on the under surface of the piston $E^1$ lifts it and the piston $F^1$ because of the larger area of the piston $E^1$.

G is the valve by which the air pressure in the cylinder E is controlled. The valve G is a differential piston valve which has a short reciprocation within its casing $G^1$ and its function is to open and close the port $g$ which connects the reservoir $a$ with the under side of the piston $E^1$. The top $g^1$ of this valve has a larger area than the bottom $g^2$ and the cylinder in which the valve slides varies in diameter accordingly. A tube $G^2$ extends from the chamber under the valve nearly to the bottom of the reservoir to lead compressed air to the valve and through it to the cylinder E. By carrying this tube nearly to the bottom of the reservoir $a$ any moisture laden air is carried off through the apparatus, so that any accumulation of moisture will be prevented. A port $g^3$ which serves as both an inlet and exhaust for the upper cylinder of the valve casing, opens from this upper cylinder of the valve casing $G^1$, and a port $g^4$ from the middle portion thereof relieves any pressure which may accumulate between the two pistons.

$G^4$ is an oil cup located on top of the valve casing from which oil may be drawn by a wick feed or in any other suitable way to lubricate the parts.

The time between the strokes of the bell hammer is governed by the time which it takes to exhaust the air from the cylinder E, after the piston has been raised. For this purpose the cylinder E has an exhaust port $e$ and there is a plurality of passages $h$, $h^1$, each of which is controlled by a throttle screw $j$, $j^1$, $j^2$. Two of these throttles are shown in detail in Fig. 9. Each consists of a screw $j$, $j^1$, $j^2$, screwing into an opening in a boss on the casting forming the lower cylinder E and capable of partially closing any one of the air passages. Each screw is normally held from turning by a spring $j^4$ which expands between a washer under the head of the screw and a recess in the casting, preferably. By turning any screw the passage through that port may be throttled more or less. In practice the screw $j$ in port $e$ is turned to open its passage practically wide, another $j^1$ in passage $h$ to close its passage slightly, and the third $j^2$ in passage $h^1$ to close its passage still more, but at the same time to allow the exhaust to pass through it. A code wheel H and a pawl lever K for operating it are provided to control the direction of the air through these passages. As below described the pawl lever has an opening $e^1$ adapted to register with the upper end of the exhaust port $e$ and the code wheel has a series of openings $h^2$ each adapted to register with the opening $e^1$ when said opening $e^1$ is in register with the exhaust port $e$ and allow the air from the port $e$ to pass directly into the chamber $A^2$. At other times the air may be directed through one of the passages $h$, $h^1$ as below described.

The code wheel H and pawl lever K are mounted on a stud L projecting from the casing. A friction disk $L^1$ lies next the code wheel and the parts are held together to prevent leaking by a spring $L^2$ and nuts $L^3$ which also prevent any tendency of the code wheel to turn backward. The code wheel has ratchet teeth on its periphery corresponding in number to the number of blows intended to be struck to give a predetermined signal. The pawl lever carries a pawl $h^6$ attached thereto at $h^7$ adapted to engage these teeth. The pawl lever is operated by a cam rod M connected to it at $m$ and running up in bearings above the top of the cylinder E. Its upper end is grooved as at $h$ to form a cam surface which rests upon a cam roll $n$. This cam roll $n$ is mounted on an arm $n^3$ on the end of the shaft $n^1$ which is mounted in bearings $n^2$. On the shaft $n^1$ is a loose pinion N which engages and is turned by a rack $N^1$ mounted on that part of the piston rod D which runs in the cylinder F so that as the piston rod D rises and falls it oscillates the pinion through the means of this rack. The pinion N carries a lug $N^2$ which engages a corresponding lug $N^3$ on a sleeve $N^4$ which is pinned to the shaft $n^1$ (see Fig. 10) so that it will be engaged by the lug $N^2$ and give to the shaft a portion of a turn. By this means the pawl lever K of the code wheel H is caused to operate at the proper time and for the proper length of time to move the code wheel. The return movement of the cam rod M is caused by the spring $M^1$ which lies between the pin $m^2$ in the rod and the under surface of the casing and is compressed by the lifting of the cam rod.

The code wheel H has a series of openings $h^2$, each adapted to register with the upper end of the port $e$ through a correspending opening $e^1$ in the pawl lever K, and it also has bypasses or grooves $e^2$, $e^3$, each of which registers at one end with the upper end of port $e$, the other end of bypass $e^2$ registering with branch $h$ and the other end of bypass $e^3$ registering with branch $h^1$. The pawl lever K has openings $k^1$ and $k^2$ one of which $k^1$ registers from time to time with the bypass $e^2$ to allow the air to escape from the exhaust port $e$ through it and the passage $h^1$ and the other $k^2$ registers from time to time (see Fig. 15) with the bypass $e^3$ to allow the air to escape from the port $e$ through it and the passage $h$. It will thus be seen that the exhaust from below the piston $E^1$ passes out through the port $e$ and from thence through openings $e^1$ in lever K and $h^2$ in the code wheel, in which case there is a rapid exhaust, or through the opening $k^1$, bypass $e^2$ and passage $h^1$ or through the opening $k^2$, bypass $e^3$ and passage $h$. In the latter cases the exhaust is slower depending upon the adjustment of the throttle screws $j^1$, $j^2$. The passages $h$, $h^1$ both open into the chamber $A^2$ (see Fig. 16). In any case it eventually passes out into the chamber $A^2$ which serves as an exhaust chamber and from which if the pressure becomes too great it may pass out through the nipple $a^5$ as below described. The pawl lever K also has a bypass $k$ which serves as a passage to connect the port $g^3$ from the upper part of the valve cylinder G with the inlet $g^5$ from the reservoir $a$, or with the exhaust port $g^6$.

These parts are arranged and operated as follows. The bottom or smaller end of the valve is always under air pressure supplied through the tube $G^2$, and hence it will be in its upper position (opening the port $g$ to allow air to pass into the cylinder E under the piston $E^1$) except when pressure is supplied from the air reservoir $a$ to its larger or upper end through the port $g^3$ which may be connected with the reservoir $a$ through the bypass $k$ and passage $g^5$ (see Fig. 13). After the piston has been lifted and a blow struck, the code wheel having been simultaneously turned, the port $e$ is connected with one of the openings $h^2$ so that the air below the piston $E^1$ will exhaust quickly into the upper chamber. At the same time the valve port $g^3$ is connected through the by-pass $k$ and exhaust port $g^6$ with the upper chamber $A^2$ through one of the openings $h^2$ so that the air pressure on the larger or upper end of the valve which has driven the valve G down is released and the valve begins to rise and allow air to pass into the cylinder E again, thus causing the hammer to strike a blow. This action is repeated until by the turning of the code wheel one of the bypasses $e^2$ connects the port $e$ with say the branch $h$ which being contracted by its throttle allows the exhaust to escape more slowly so that there is a decided pause between the last stroke and the next. The former operation is thereafter repeated until the bypass $e^3$ connects $e$ with $h^1$ when owing to the position of its throttle screw there is a still longer pause between the blows. By properly combining these passages any desired signal may be given. For example, by following the first stroke of the bell with three other strokes at short intervals due to the use of throttle $j$ adjusted as described, then by a longer interval due to throttle $j^1$ followed by five strokes at short intervals due to throttle $j$ again, followed by a very long interval due to throttle $j^2$, we have the code number 45, thus: 1-1-1-1_____ 1-1-1-1-1_____after which the number is repeated.

We noted that the upper or smaller piston is always connected with the reservoir and that when the lower reservoir is connected with the under side of the lower piston it overcomes the pressure because of the larger area of the lower piston. In the same way the under or smaller surface of the valve is always connected with the reservoir and the pressure tending to lift it is overcome because of the larger area of the outer end of the valve.

It is best to use rubber gaskets at all the joints and also to provide a dashpot to check the rise of the piston $E^1$. For this purpose the upper surface of the piston has an annular groove as at P to fit the collar $P^1$ which hangs from the under side of the top.

We have shown in Fig. 12 the usual manner of connecting mechanism embodying our present invention with an air pump and controlling valves. The details of this mechanism are described in our application, Serial No. 269,999, filed July 17, 1905, so that it need only be briefly described here.

Q is an air pump connected by the pipe and the tube $q$ through a relief valve $Q^1$ with the nipple $a^4$. The nipple $a^5$ is connected with a back pressure valve $Q^2$ by the tube and pipe $q^1$. A cross connection $q^2$ connects pipe $q$ with a three-way cock $Q^4$. Each pipe $q$, $q^1$ carries a gage R, $R^1$ by which the pressures in those pipes will be indicated. The relief valve limits the rise in pressure in the compressed air reservoir $a$ and the back pressure valve prevents the pressure in the exhaust chamber $A^2$ from decreasing below a given degree.

When the apparatus is operating the three-way cock is turned to cut off the passage through the connection $q^2$. When it is desired to stop the bell this can be done by equalizing the pressures in the compressed air and exhaust reservoirs and to accomplish this the three-way cock is turned to connect the pipes $q$ and $q^1$ through the pipe $q^2$. The gages R, $R^1$ indicate whether the submerged bell is sounding or not by indicating the relative pressures in the compressed air and exhaust chambers.

The above is the simplest form of our invention now known to us.

We do not mean to limit ourselves to the exact construction herein shown and described.

What we claim as our invention is:—

1. A means for operating the striking means of a submarine signaling apparatus having a sounder and a striking means comprising a cylinder, a differential piston moving therein and connected with said striking means and a compressed air reservoir permanently connected with the smaller side of said piston, and intermittently connected with the larger side thereof, in combination with a casing containing said cylinder and said reservoir, as described.

2. A means for operating a submarine signaling apparatus having a sounder and a striking means comprising a casing containing a compressed air reservoir connected with a source of air compression, a differential piston adapted to be connected with said striking means, cylinders of different sizes therefor, the smaller cylinder being constantly connected with said compressed air reservoir, a connection between said larger cylinder and said compressed air reservoir and a valve adapted to intermittently open and close said connection.

3. As a means for supporting the sounder in a signaling apparatus having a sounder and a striking means, a sounder and a casing supporting said sounder and containing a compressed air reservoir and a compressed air motor adapted to be connected to operate the striking means of said sounder as described.

4. In an apparatus adapted to operate a submarine signal of the kind described, an airtight casing adapted to be submerged and to support a sounder and striker, said casing containing a compressed air reservoir and a motor connected thereto and adapted to be operated by compressed air therefrom to operate said striker as set forth.

5. In an apparatus adapted for submarine signaling having a sounder and a striking means, a casing containing two chambers, one adapted to serve as a compressed air reservoir and adapted to be connected with an air compressor, the other adapted to serve as an exhaust reservoir, a piston mechanism located in said casing, means whereby said compressed air reservoir is connected with the cylinder of said piston mechanism to operate said piston, and means whereby said cylinder is intermittently connected with said exhaust reservoir, as and for the purposes described.

6. In an apparatus adapted for submarine signaling having a sounder and means for striking it, a casing containing a compressed air reservoir and an exhaust reservoir, means for operating said striking means at predetermined intervals, said means being operatively connected to said compressed air reservoir at predetermined intervals and also being intermittently connected to said exhaust chamber, a differential valve adapted to control said intermittent connection between said compressed air reservoir and said striker operating means, the smaller end of said valve being intermittently connected to said compressed air reservoir, as described.

7. In an apparatus for submarine signaling having a sounder and a striking means, means for operating said striking means comprising a compressed air chamber, a cylinder connected thereto, a piston reciprocating therein, a piston rod, a valve chamber and a valve controlling the inlet to said cylinder, and means for operating said valve comprising connections between said valve chamber and said compressed air chamber and means for controlling the passages through said connections operated from said piston as set forth.

8. In an apparatus for submarine signaling having a sounder and a striking means therefor, in combination, a casing and contained therein a compressed air reservoir, a cylinder, a piston operating therein, a connection between said reservoir and said cylinder provided with a passage for air between said reservoir and said cylinder, a differential valve located in said passage, the smaller side of said valve being constantly exposed to direct pressure from said reservoir and the larger side thereof being intermittently exposed thereto as set forth.

9. In an apparatus adapted for submarine signaling having a sounder and a striking mechanism, means for operating said striking mechanism comprising a piston, a cylinder therefor having an inlet and an exhaust, a valve controlling said inlet and automatically variable means other than said valve for controlling the rapidity of the exhaust from said cylinder as described.

10. In an apparatus adapted for submarine signaling having a sounder and a striking mechanism, means for operating said striking mechanism comprising a piston, a cylinder therefor, and means for supplying air to and exhausting it from said cylinder comprising a valve and automatically variable means other than said valve for controlling the rapidity of the exhaust from said cylinder as described.

11. In an apparatus for signaling having a sounder and a striking means, means for operating said striking means comprising a piston, a cylinder therefor, a compressed air reservoir, means for admitting compressed air intermittently therefrom to said cylinder and means for exhausting air from said cylinder comprising two or more passages having different exhausting capacities and means whereby said passages may be connected to said cylinder in predetermined succession.

12. In an apparatus adapted for signaling having a sounder and a striking means, means for operating said striking means comprising a piston, a cylinder therefor, a compressed air reservoir, means for admitting compressed air intermittently therefrom to said cylinder and means for exhausting air from said cylinder comprising two or more passages each having means for the adjustment of its exhausting capacity and means whereby said passages may be connected to said cylinder in predetermined succession.

13. In an apparatus for signaling having a sounder and a striking means, means for operating said striking means comprising a piston, a cylinder therefor, a compressed air reservoir, means for admitting compressed air intermittently therefrom to said cylinder and means for exhausting air from said cylinder comprising two or more passages having different exhausting capacities and automatic means whereby said passages may be connected to said cylinder in predetermined succession.

14. In an apparatus adapted to operate a signaling device having a sounder and a striker, means for operating said striker comprising a cylinder, a piston, a valve adapted to control the inlet to said cylinder and means for controlling the exhaust from said cylinder comprising two or more passages having different exhausting capacities, an exhaust outlet from said cylinder, a code wheel provided with openings connectible with said exhaust and either one of said passages, and means for operating said code wheel.

15. In an apparatus adapted to operate a signaling device having a sounder and a striker, means for operating said striker comprising a cylinder, a piston, a valve adapted to control the inlet to said cylinder and means for controlling the exhaust from said cylinder comprising two or more passages having different exhausting capacities, an exhaust outlet from said cylinder, a code wheel provided with openings connectible with said exhaust and either one of said passages and means for operating said code wheel comprising a ratchet connected to said code wheel, a pawl lever, a pawl operating said ratchet, said pawl lever having openings adapted to register with said exhaust and the openings in said code wheel, and means for operating said pawl lever as and for the purposes set forth.

16. In an apparatus adapted to operate a signaling device having a sounder and a striker, means for operating said striker comprising a cylinder, a piston, a valve adapted to control the inlet to said cylinder and means for controlling the exhaust from said cylinder comprising two or more passages having different exhausting capacities, an exhaust outlet from said cylinder, a code wheel provided with openings connectible with said exhaust and either one of said passages and means for operating said code wheel, a pawl lever, a pawl operating said ratchet, said pawl lever having openings and bypasses adapted to register with said exhaust and the openings in said code wheel, and means for operating said pawl lever as and for the purposes set forth.

17. In an apparatus adapted to operate a signaling device having a sounder and a striker, means for operating said striker comprising a cylinder, a piston, a valve adapted to control the inlet to said cylinder and means for controlling the exhaust from said cylinder comprising two or more passages having different exhausting capacities, an exhaust outlet from said cylinder, a code wheel provided with openings connectible with said exhaust and either one of said passages and means for operating said code wheel comprising a ratchet connected to said code wheel, a pawl lever, a pawl operating said ratchet, said pawl lever having openings adapted to register with said exhaust and the openings in said code wheel, and means for operating said pawl lever comprising a rack connected to said piston, a pinion and means carrying said pinion and connected to said pawl lever, whereby the reciprocations of said piston will cause the reciprocation of said pawl lever, as and for the purposes set forth.

18. In an apparatus adapted to operate a signaling device having a sounder and a striker, means for operating said striker comprising a cylinder, a piston, a valve adapted to control the inlet to said cylinder and means for controlling the exhaust from said cylinder comprising two or more passages having different exhausting capacities, an exhaust outlet from said cylinder, a code wheel provided with openings connectible with said exhaust and either one of said passages, and means for operating said code wheel, in combination with a passage into a valve chamber, also controllable by said code wheel to allow the passage of compressed air into said valve chamber or its exhaust therefrom.

19. In an apparatus adapted for submarine signaling having a sounder and a striking means, means for operating said striking means comprising a piston, a cylinder therefor having inlet and exhaust ports, a valve controlling the inlet to said cylinder, a compressed air reservoir connected with said inlet port, two or more passages connectible to said exhaust port and a throttle controlling each passage and means whereby said exhaust port may be connected with either passage in a predetermined succession as set forth.

20. In an apparatus adapted for submarine signaling having a sounder and a striking means, a compressed air chamber, a cylinder having an inlet port and an exhaust port, a connection containing a passage between said inlet port and said compressed air chamber, a valve for controlling said passage and connections from said exhaust port provided with throttles, and automatic means whereby said exhaust may be connected to either one of said throttled passages.

21. In an apparatus adapted for submarine signaling having a sounder and a striking means therefor, operating means for operating said striking means comprising a compressed air reservoir, a cylinder and a piston therein, a valve for intermittently connecting one end of said cylinder with said compressed air reservoir, and means common to both piston and valve whereby their exhaust connections are made and broken as described.

22. In an apparatus adapted to operate a submarine signaling apparatus having a sounder, means for operating the sounder comprising a differential valve, its casing, a differential piston, its cylinder, a compressed air reservoir, the smaller end of said valve casing and of said cylinder being permanently connected with said reservoir, the larger end of said valve casing and of said cylinder being intermittently connected with said reservoir, and means operated by the piston whereby said connections are intermittently made, as set forth.

23. In an apparatus adapted to operate a submarine signaling apparatus having a sounder, means for operating the sounder comprising a differential piston, its cylinder, a differential valve, its casing, a compressed air reservoir, the smaller end of said valve casing and of said cylinder being permanently connected with said reservoir, and the larger end of said valve casing and of said cylinder being intermittently connected with said reservoir, an exhaust for said cylinder and a single means operated by said piston whereby said valve connection is intermittently made to alternately connect the cylinder inclosing the larger end of the piston with said reservoir and with said exhaust, as described.

24. In an apparatus adapted to operate a submarine signaling device having a sounder and a striking means, means for operating said striking means comprising a casing and located therein a differential piston, its cylinder, a differential valve, its casing, a compressed air reservoir, a passage permanently connecting said reservoir with the smaller end of said valve casing, a passage permanently connecting the smaller end of said cylinder with said reservoir, the larger end of said valve casing being intermittently connected with said reservoir, and means for so connecting it, and means whereby the larger end of said valve casing is intermittently connected with said reservoir as described.

25. In an apparatus adapted to operate a submarine signaling device having a sounder and a striking mechanism, means for operating said striking mechanism comprising a compressed air reservoir, a piston, a cylinder and a valve adapted to connect said reservoir with said cylinder, an exhaust and means operated by said piston whereby said exhaust is connected and disconnected from said cylinder, said means comprising a ratchet wheel provided with suitable vents adapted to register with said exhaust and a pawl plate and connections between said pawl plate and said piston, as described.

EDWARD C. WOOD.
HARRY G. MARDEN.

In presence of—
SAMUEL T. FROTHINGHAM,
LAURA I. MUNROE.